(12) United States Patent
Choi et al.

(10) Patent No.: US 12,036,767 B2
(45) Date of Patent: Jul. 16, 2024

(54) WINDOW AND DISPLAY DEVICE INCLUDING THE SAME

(71) Applicant: Samsung Display Co., Ltd., Yongin-si (KR)

(72) Inventors: Min-Hoon Choi, Seoul (KR); Minsang Koo, Seongnam-si (KR); Kyung-Man Kim, Anyang-si (KR); Sanghoon Kim, Hwaseong-si (KR); Seongjin Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 161 days.

(21) Appl. No.: 17/185,641

(22) Filed: Feb. 25, 2021

(65) Prior Publication Data

US 2021/0379869 A1  Dec. 9, 2021

(30) Foreign Application Priority Data

Jun. 3, 2020 (KR) .................. 10-2020-0066769

(51) Int. Cl.
*B32B 17/10* (2006.01)
*B32B 7/022* (2019.01)
(Continued)

(52) U.S. Cl.
CPC .............. *B32B 17/10* (2013.01); *B32B 7/022* (2019.01); *B32B 7/025* (2019.01); *B32B 7/12* (2013.01); *B32B 37/144* (2013.01); *B32B 37/24* (2013.01); *C09D 4/00* (2013.01); *B32B 27/283* (2013.01); *B32B 2255/10* (2013.01); *B32B 2255/24* (2013.01); *B32B 2255/28* (2013.01);
(Continued)

(58) Field of Classification Search
CPC ......... B32B 17/10; B32B 7/022; B32B 7/025; B32B 7/12; B32B 37/144; B32B 37/24; B32B 2255/10; B32B 2255/24; B32B 2255/28; B32B 2307/558; B32B 2307/56; B32B 2457/20; C09D 4/00; G06F 1/1652; G06F 1/1626; G09F 9/301; G02F 1/133308; G02F 1/133311
See application file for complete search history.

(56) References Cited

U.S. PATENT DOCUMENTS 9,586,858 B2  3/2017  Bellman et al.
10,658,615 B2  5/2020  Oh et al.
(Continued)

FOREIGN PATENT DOCUMENTS

KR           10-1806038 B1    12/2017
KR       10-2018-0062507     6/2018
(Continued)

*Primary Examiner* — Michael B Nelson
(74) *Attorney, Agent, or Firm* — Lewis Roca Rothgerber Christie LLP (57) ABSTRACT

Provided is a window including a glass substrate, an impact absorbing layer disposed on the glass substrate and having a first storage modulus, and at least one coating layer disposed on at least one of top and bottom surfaces of the impact absorbing layer, respectively, and having a second storage modulus that is greater than the first storage modulus, wherein a ratio between a first thickness of the impact absorbing layer and a second thickness of at least one of the at least one coating layer is about 1:0.0002 to about 1:0.05.

14 Claims, 8 Drawing Sheets

(51) Int. Cl.
  *B32B 7/025* (2019.01)
  *B32B 7/12* (2006.01)
  *B32B 37/14* (2006.01)
  *B32B 37/24* (2006.01)
  *C09D 4/00* (2006.01)
  *B32B 27/28* (2006.01)
  *G06F 1/16* (2006.01)

(52) U.S. Cl.
  CPC ..... *B32B 2307/558* (2013.01); *B32B 2307/56* (2013.01); *B32B 2457/20* (2013.01); *G06F 1/1652* (2013.01); *Y10T 428/31663* (2015.04)

(56) References Cited

U.S. PATENT DOCUMENTS

| | | | |
|---|---|---|---|
| 11,800,736 | B2 | 10/2023 | Yoon et al. |
| 2015/0266272 | A1* | 9/2015 | Lee .......... B32B 17/10 156/60 |
| 2016/0338219 | A1* | 11/2016 | Seo ............... G02F 1/133308 |
| 2017/0147117 | A1* | 5/2017 | Song .................. G06F 3/044 |
| 2019/0039355 | A1 | 2/2019 | Oh et al. |
| 2019/0300425 | A1 | 10/2019 | Ikadai et al. |
| 2019/0309193 | A1* | 10/2019 | Okada ............... G02B 5/3033 |

FOREIGN PATENT DOCUMENTS

| KR | 10-2018-0093649 A | 8/2018 |
|---|---|---|
| KR | 10-2018-0098445 | 9/2018 |
| KR | 10-2019-0014303 A | 2/2019 |
| KR | 10-1949561 B1 | 2/2019 |
| KR | 10-2019-0058447 A | 5/2019 |

* cited by examiner

WINDOW AND DISPLAY DEVICE INCLUDING THE SAME

CROSS-REFERENCE TO RELATED APPLICATION

This application claims priority to, and the benefit of, Korean Patent Application No. 10-2020-0066769, filed on Jun. 3, 2020, the entire contents of which are hereby incorporated by reference.

BACKGROUND

The present disclosure herein relates to a window having an improved impact resistance property and an improved foldable property, and a display device including the same.

A display device displays various images on a display screen to provide information to a user. In general, the display device displays information within an assigned screen. In recent years, flexible display devices including a foldable flexible display panel have been developed. The flexible display device may be folded, rolled, or bent unlike a rigid display device. The flexible display device, which is variously changeable in shape, may be easily carried regardless of a typical screen size, so that user convenience improves.

Also, the foldable display device generally has a flexible property. While the foldable display device inevitably has a small thickness to have the flexible property, the small thickness may cause reduction in impact resistance property, and thus the foldable display device having the small thickness may be vulnerable to an external impact.

SUMMARY

The present disclosure provides a window having an improved impact resistance property while maintaining a foldable property by including a coating layer having a relatively small thickness located on an impact absorbing layer.

The present disclosure also provides a display device for reducing or preventing the likelihood of damage to a display panel due to an external impact by including a window having an improved impact resistance property while maintaining a foldable property.

Some embodiments of the present disclosure provide a window including a glass substrate, an impact absorbing layer disposed on the glass substrate and having a first storage modulus, and at least one coating layer disposed on at least one of top and bottom surfaces of the impact absorbing layer, respectively, and having a second storage modulus that is greater than the first storage modulus, wherein a ratio between a first thickness of the impact absorbing layer and a second thickness of at least one of the at least one coating layer is about 1:0.0002 to about 1:0.05.

The first thickness may be in a range from about 20 μm to about 50 μm, wherein the second thickness is in a range from about 0.01 μm to about 1 μm.

The glass substrate may have a thickness in a range from about 20 μm to about 70 μm.

A ratio of the first storage modulus to the second storage modulus may be from about 1:4 to about 1:15.

The first storage modulus may be in a range from about 4 GPa to about 10 GPa, and the second storage modulus may be in a range from about 40 GPa to about 60 GPa.

The at least one coating layer may include at least one of epoxy silan, silsesquioxane, imine, and silazane.

The impact absorbing layer may include at least one of polyimide, polyethyleneterephthlate, polycarbonate, cycloolefin polymer, and triacetyl cellulose.

The at least one coating layer may be deposited by using a thermal deposition apparatus, an E-beam deposition apparatus, or a sputtering apparatus.

The window may include a folding area folded along a folding axis extending in one direction, and a first non-folding area and a second non-folding area that are spaced apart from each other with the folding area therebetween.

The at least one coating layer may include a first coating layer that overlaps the first non-folding area, and a second coating layer that overlaps the second non-folding area, and that is spaced apart from the first coating layer.

The window may further include an adhesive layer disposed on the first coating layer and the second coating layer, and filling a space between the first coating layer and the second coating layer.

The at least one coating layer may include a first sub-coating layer and a second sub-coating layer, which are sequentially laminated on the impact absorbing layer.

A sum of thicknesses of the first sub-coating layer and the second sub-coating layer may be in a range from about 0.01 μm to about 1 μm.

Each of the first sub-coating layer and the second sub-coating layer may include at least one of epoxy silan, silsesquioxane, imine, and silazane.

The window may further include a protection layer including at least one of polyimide, polyethyleneterephthlate, polycarbonate, cycloolefin polymer, and triacetyl cellulose.

The window may further include at least one adhesive layer between the protection layer and the glass substrate and/or between the glass substrate and the impact absorbing layer.

Some embodiments of the present disclosure provide a display device including a display panel, and a window on the display panel, the window including a glass substrate, an impact absorbing layer disposed on the glass substrate, and having a first storage modulus, and at least one coating layer disposed on at least one of top and bottom surfaces of the impact absorbing layer, and having a second storage modulus greater than the first storage modulus, wherein a ratio between a first thickness of the impact absorbing layer and a second thickness of at least one of the at least one coating layer is about 1:0.0002 to about 1:0.05.

The display device may further include a protection layer on the glass substrate, and at least one adhesive layer located between the protection layer and the glass substrate, between the glass substrate and the impact absorbing layer, and/or between the impact absorbing layer and the display panel.

At least one of the at least one adhesive layer may have a thickness in a range from about 10 μm to about 100 μm.

The at least one adhesive layer may include a pressure sensitive adhesive.

BRIEF DESCRIPTION OF THE FIGURES

The accompanying drawings are included to provide a further understanding of the present disclosure, and are incorporated in and constitute a part of this specification. The drawings illustrate some embodiments of the present disclosure and, together with the description, serve to explain principles of the present disclosure. In the drawings.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1A:
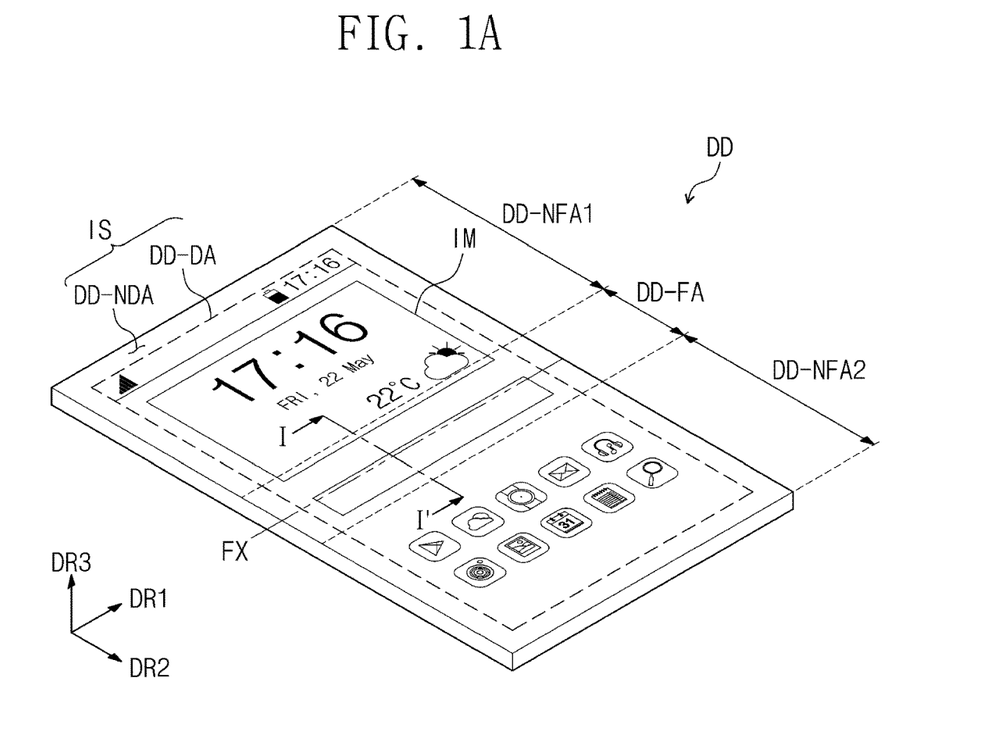
FIG. 1A is a perspective view illustrating a display device according to some embodiments of the present disclosure.
Figure 1B:
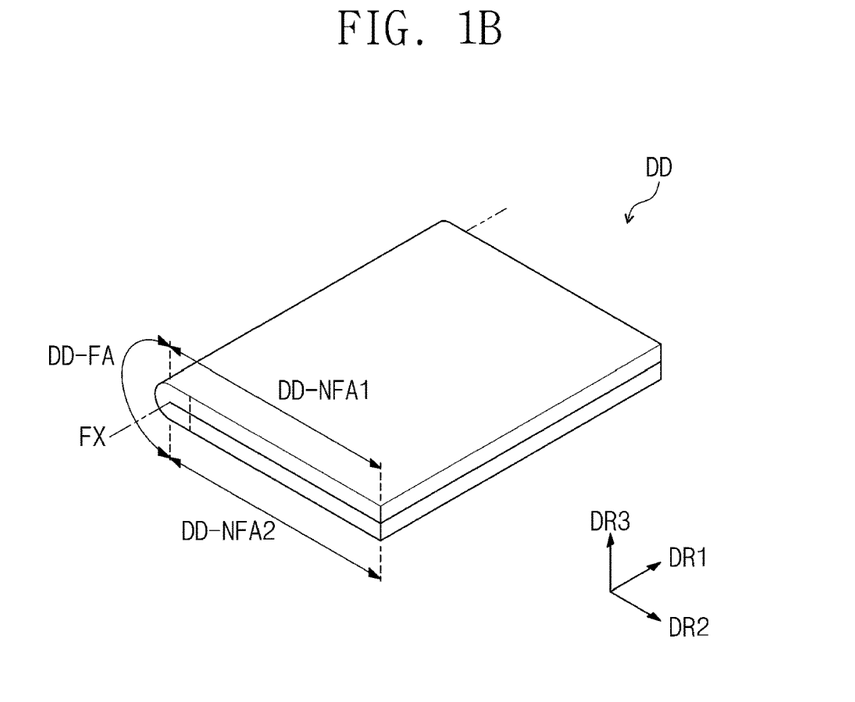
FIG. 1B is a perspective view illustrating a folded state of the display device according to some embodiments.

FIG. 1A is a perspective view illustrating a display device according to some embodiments, and FIG. 1B is a perspective view illustrating a folded state of the display device according to some embodiments of the present disclosure. Hereinafter, a display device DD according to some embodiments will be described with reference to FIGS. 1A and 1B.

Referring to FIGS. 1A and 1B, the display device DD according to some embodiments includes a display surface IS displaying an image. A display surface IS on which an image IM is displayed is parallel to, or defined by, a first direction axis DR1 and a second direction axis DR2. A normal direction that is normal to the display surface IS (e.g., a thickness direction of the display device DD) corresponds to a third direction axis DR3. A front surface (or top surface) and a rear surface (or bottom surface) of each of members to be described may be distinguished with respect to the third direction axis DR3. Hereinafter, first to third directions may be directions indicated by the first to third direction axes DR1, DR2, and DR3 and designated by the same reference numerals, respectively. Here, directions indicated by the first to third directions DR1, DR2 and DR3, as relative concepts, may be converted with respect to each other. Although a foldable display device is illustrated in the present example, the present disclosure is not limited thereto. For example, the display device DD according to some embodiments may be a rigid display device.

The display device DD according to some embodiments may be a foldable display device or a rollable display device. The display device DD according to some embodiments of the present disclosure may be used for large-sized electronic devices, such as televisions and monitors, and may be used for small- and medium-sized electronic devices, such as mobile phones, tablet computers, navigation units for vehicles, game consoles, and smart watches.

The display surface IS of the display device DD according to some embodiments may include a plurality of areas. The display device DD may include a display area DD-DA on which the image IM is displayed, and a non-display area DD-NDA that is adjacent to the display area DD-DA. The non-display area DD-NDA of the display device DD may be an area on which no image is displayed. FIGS. 1A and 1B illustrate a clock shape and icons of applications as an example of the image IM. The display area DD-DA may have a rectangular shape. The non-display area DD-NDA of the display device DD may surround the display area DD-DA. However, the present disclosure is not limited thereto. For example, the display area DD-DA and the non-display area DD-NDA may have relatively variable shapes.

The display device DD according to some embodiments may be folded with respect to a folding axis FX. When the display device DD is folded with respect to the folding axis FX by an operation of a user, the display device DD may include a folding area DD-FA, and may include non-folding areas DD-NFA1 and DD-NFA2 spaced apart from each other with the folding area DD-FA therebetween.

As the display device DD according to some embodiments is in-folded with respect to the folding axis FX, the display surface IS of the display device DD may be folded with respect to the folding axis FX so that portions of the display surface IS of the display device DD, which are distinguished based on the folding axis FX, face each other, and so that a rear surface, which is opposite to the display surface IS, is exposed to the outside.

In other embodiments, as the display device DD is out-folded with respect to the folding axis FX, the display surface IS may be exposed to the outside, and the rear surface, which is the opposite to the display surface IS, may be folded with respect to the folding axis FX so that portions of the rear surface, which are distinguished based on the folding axis FX, face each other.

Although one folding area DD-FA and first and second non-folding areas DD-NFA1 and DD-NFA2 are illustrated in FIGS. 1A and 1B, the present disclosure is not limited to the numbers of the folding area DD-FA and the first and second non-folding areas DD-NFA1 and DD-NFA2. For example, the display device DD may include two or more plurality of non-folding areas and a plurality of folding areas respectively located therebetween.

Figure 2A:
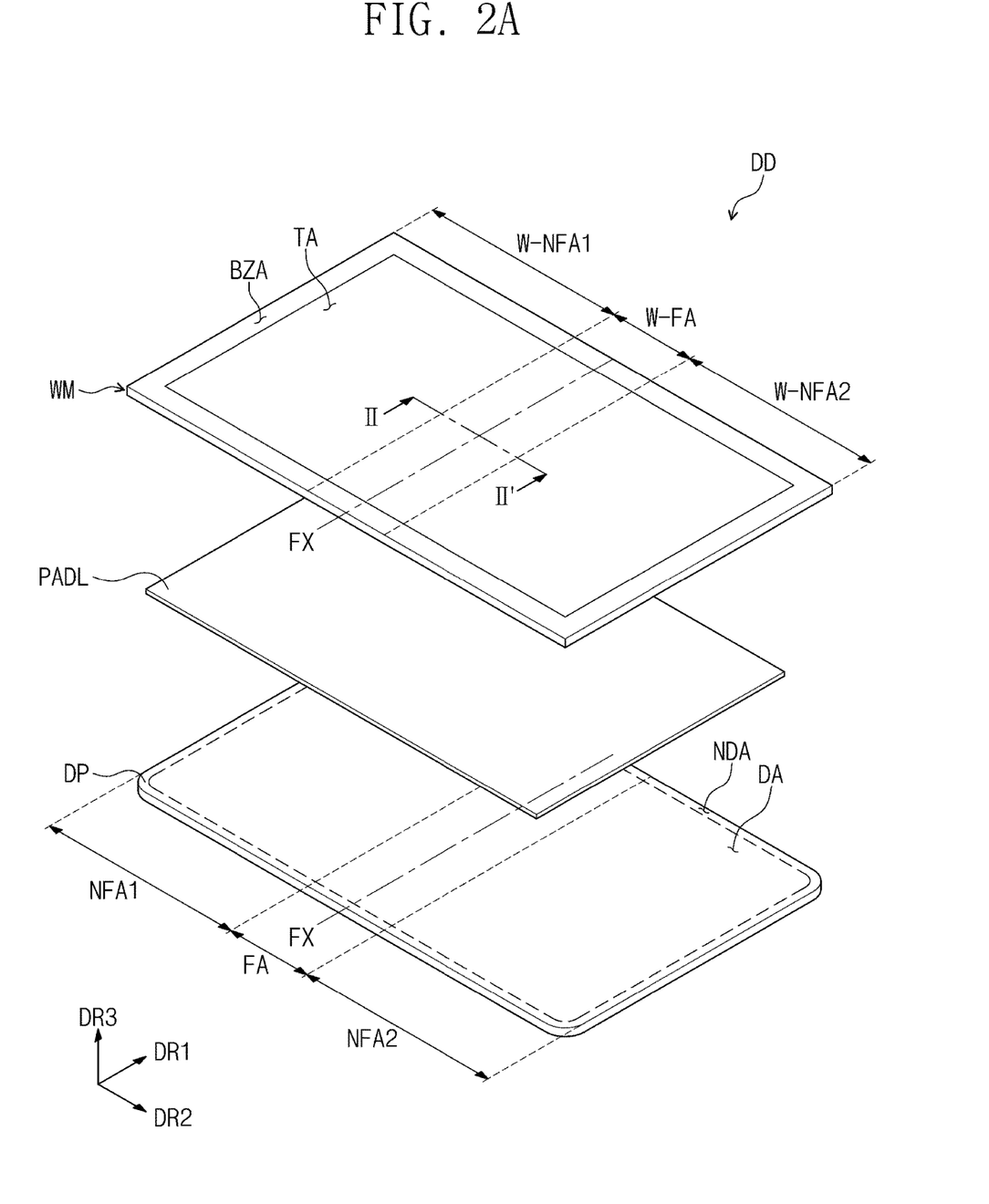
FIG. 2A is an exploded perspective view illustrating the display device according to some embodiments.
Figure 2B:
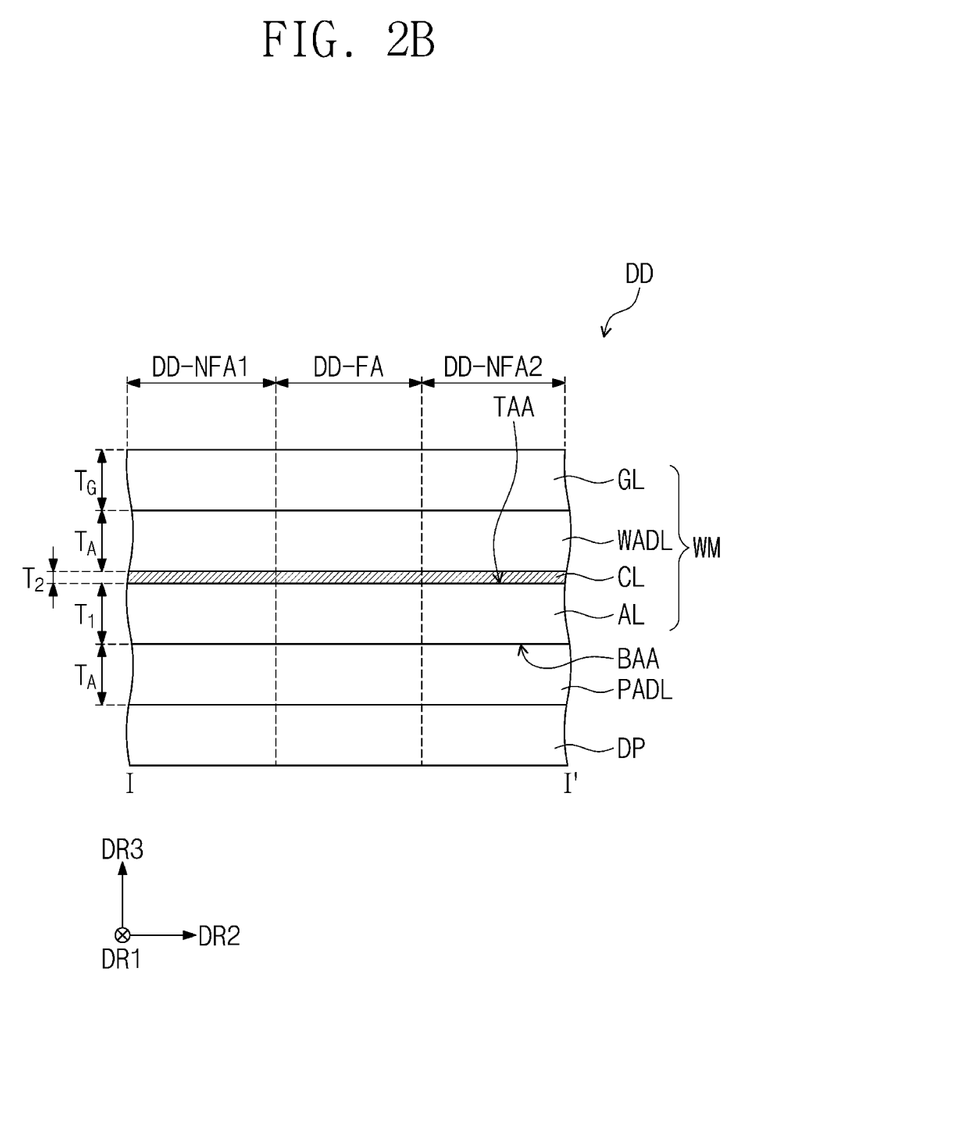
FIG. 2B is a cross-sectional view illustrating the display device according to some embodiments.

FIG. 2A is an exploded perspective view illustrating the display device according to some embodiments of the present disclosure, and FIG. 2B is a cross-sectional view illustrating the display device according to some embodiments of the present disclosure. Hereinafter, the display device DD according to some embodiments will be described in detail with reference to FIGS. 2A and 2B.

Referring to FIGS. 2A and 2B, the display device DD according to some embodiments may include a display panel DP, a window WM located on the display panel DP, and an adhesive layer PADL located between the display panel DP and the window WM.

In some embodiments, the display panel DP includes a display area DA and a non-display area NDA on a plane. The display area DA and the non-display area NDA of the display panel DP may correspond to the display area DD-DA and the non-display area DD-NDA of the display device DD (refer to FIG. 1A), respectively. However, the display area DA and the non-display area NDA of the display panel DP is not necessarily the same as the display area DD-DA and the non-display area DD-NDA of the display device DD (refer to FIG. 1A), and may be changed according to a structure/design of the display panel DP.

In some embodiments, the display panel DP may include a folding area FA and non-folding areas NFA1 and NFA2. The folding area FA and the non-folding areas NFA1 and NFA2 of the display panel DP correspond to the folding area DD-FA and the non-folding areas DD-NFA1 and DD-NFA2 of the display device DD (refer to FIG. 1A), respectively.

In some embodiments, the display panel DP may include a plurality of signal lines and a plurality of pixels. An area on which a plurality of pixels are located may be defined as the display area DA, and the non-display area NDA may be defined along an edge of the display area DA.

The plurality of signal lines include gate lines, data lines, a power line, and a control signal line. The gate lines are connected to corresponding pixels of the plurality of pixels, respectively, and the data lines are connected to corresponding pixels of the plurality of pixels, respectively. The power line is connected to the plurality of pixels. A gate driving circuit connected to the gate lines may be located at one side of the non-display area NDA. The control signal line may provide control signals to the gate driving circuit.

Each of the gate lines, the data lines, the power line, and the control signal line may include a signal line part and may include display panel pads each connected to an end of the signal line part. The signal line part may be defined as a portion excluding the display panel pads of each of the gate lines, the data lines, the power line, and the control signal line.

The window WM may include a folding area W-FA and non-folding areas W-NFA1 and W-NFA2 spaced apart from each other with the folding area W-FA therebetween. The folding area W-FA of the window WM overlaps the folding area FA of the display panel DP, and a first non-folding area W-NFA1 and a second non-folding area W-NFA2 of the window WM overlap the first non-folding area NFA1 and the second non-folding area NFA2 of the display panel DP, respectively.

The window WM may include a transmission area TA overlapping the display area DA, and may include a bezel area BZA overlapping the non-display area NDA. The transmission area TA may transmit and emit the image IM (refer to FIG. 1A), which is emitted from the display area DA, to the outside. The bezel area BZA may surround the transmission area TA. However, this is merely illustrative. For example, the bezel area BZA may be located adjacent to only one side of the transmission area TA or may be omitted. The display device DD according to some embodiments of the present disclosure may include various embodiments and is not particularly limited.

The window WM may include a glass substrate GL, an impact absorbing layer AL located below the glass substrate GL, an adhesive layer WADL coupling the glass substrate GL with the impact absorbing layer AL, and a coating layer CL located on the adhesive layer WADL and the impact absorbing layer AL. However, the adhesive layer WADL may be omitted, or the impact absorbing layer AL may be located directly on the glass substrate GL without the adhesive layer WADL. A lamination structure of the window WM will be described in detail later.

Figure 3A:
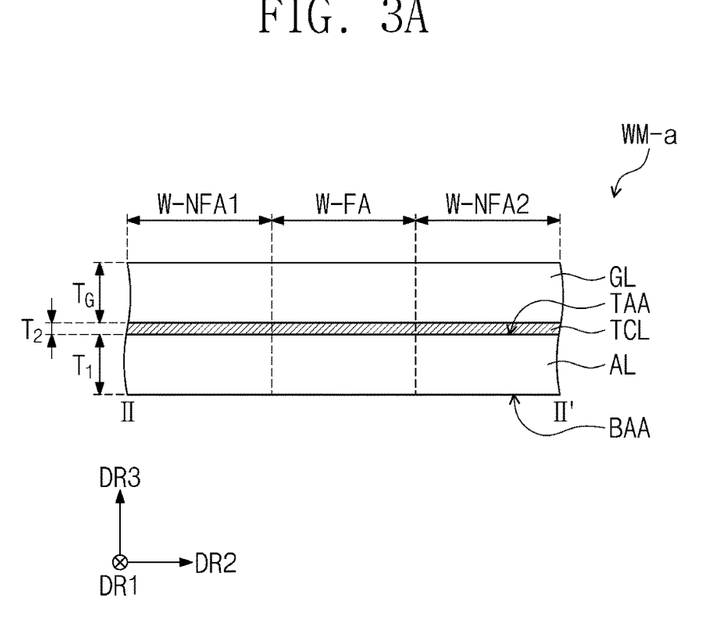
FIG. 3A is a cross-sectional view illustrating a window according to some embodiments.
Figure 3B:
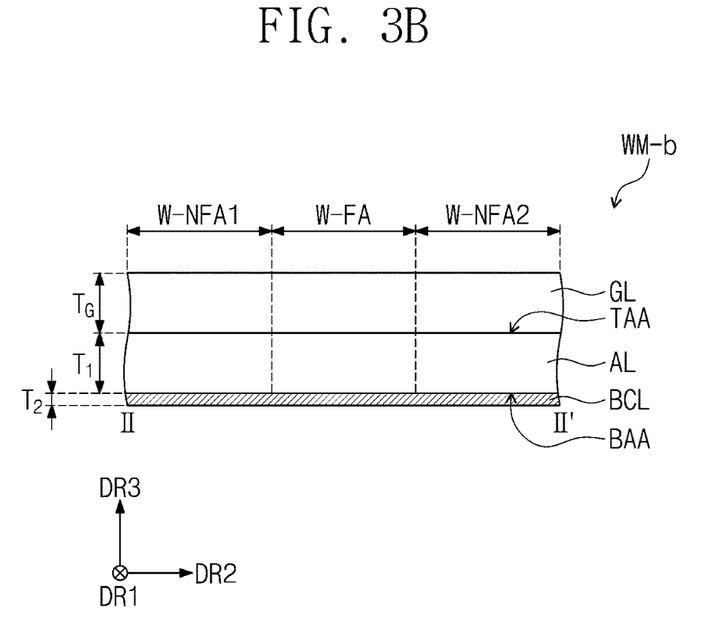
FIG. 3B is a cross-sectional view illustrating a window according to some embodiments.
Figure 3C:
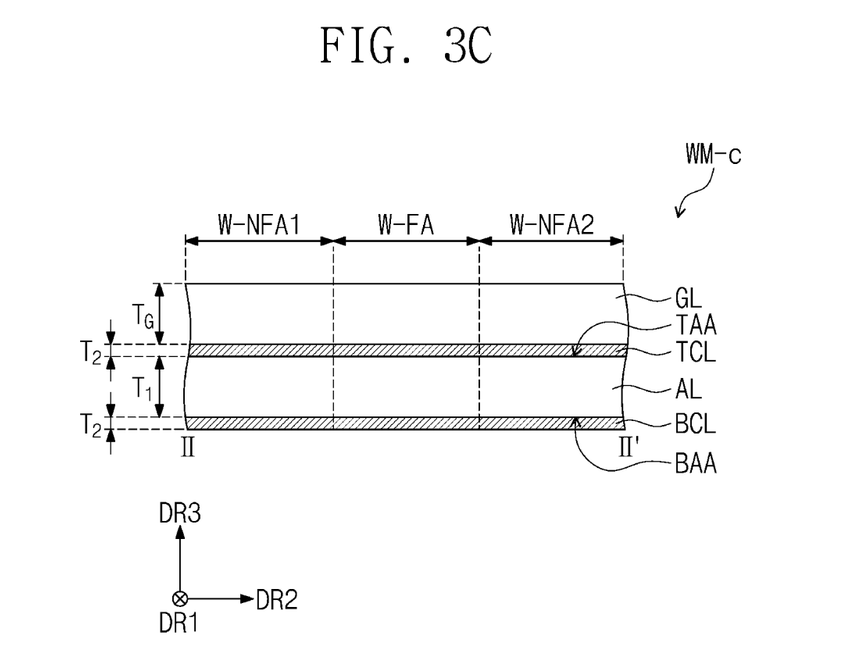
FIG. 3C is a cross-sectional view illustrating a window according to some embodiments.

FIGS. 3A to 3C are cross-sectional views each illustrating a window according to some embodiments. Hereinafter, a window WM-a, a window WM-b, and a window WM-c according to some embodiments will be described in detail with reference to FIGS. 3A to 3C.

Referring to FIGS. 3A to 3C, the window WM-a, the window WM-b, and the window WM-c may include a glass substrate GL, an impact absorbing layer AL located on the glass substrate GL, and at least one coating layer TCL and BCL located on a top surface TAA or a bottom surface BAA of the impact absorbing layer AL. The coating layer located on the top surface TAA is defined as an upper coating layer TCL, and the coating layer located on the bottom surface BAA is defined as a lower coating layer BCL. Referring to FIGS. 3A to 3C, a feature of disposing the impact absorbing layer AL on the glass substrate GL represents that the impact absorbing layer AL is located below the glass substrate GL.

The impact absorbing layer AL may include at least one of polyimide, polyethyleneterephthlate, polycarbonate, cycloolefin polymer, and triacetyl cellulose. The impact absorbing layer AL functions to absorb an external impact, and to reduce an impact transmitted to the display panel DP (refer to FIG. 2A) located below the window WM-a, the window WM-b, and the window WM-c.

The coating layer TCL and BCL may include at least one of epoxy silan, silsesquioxane, imine, and silazane. When an external impact is applied to the window WM-a, the window WM-b, or the window WM-c, the coating layer TCL and BCL may disperse the external impact in a second direction DR2. The coating layer TCL and BCL may be deposited by, for example, a thermal deposition apparatus, an E-beam deposition apparatus, or a sputtering deposition apparatus.

The impact absorbing layer AL may have a first storage modulus, and the coating layer TCL and BCL may have a second storage modulus that is greater than the first storage modulus. The first storage modulus may be in a range from about 4 GPa to about 10 GPa, and the second storage modulus may be in a range from about 40 GPa to about 60 GPa. The storage modulus may be measured at a room temperature by using a nano indenter. A ratio between the first storage modulus and the second storage modulus may be about 1:4 to about 1:15. That is, the second storage modulus may be greater by about 4 times to about 15 times than the first storage modulus.

The impact absorbing layer AL may have a first thickness T1, and the coating layer TCL and BCL may have a second thickness T2 that is less than the first thickness T1. The first thickness T1 may be in a range from about 20 µm to about 50 µm, and the second thickness T2 may be in a range from about 0.01 µm to about 1 µm. When the first thickness T1 is less than about 20 µm, an impact resistance property of the window WM-a may be reduced, and when the first thickness T1 is greater than about 50 µm, a bending torque (BT) of the window WM-a may increase to reduce a foldable property/foldability.

When the second thickness T2 is less than about 0.01 µm, the impact resistance property of the window WM-a may be reduced, and when second thickness T2 is greater than about 1 µm, the bending torque (BT) of the window WM-a may increase to reduce the foldable property. A ratio between the first thickness T1 and the second thickness T2 may be about 1:0.0002 to about 1:0.05. That is, the thickness of the coating layer TCL and BCL may be about 0.0002 times to about 0.05 times than that of the impact absorbing layer AL.

In some embodiments, the glass substrate GL may include tempered glass for protecting a surface of the display device. In some embodiments, the glass substrate GL may include foldable flexible glass. In some embodiments, the glass substrate GL may be ultra-thin glass (UTG). A functional layer such as an anti-fingerprint layer or a hard coating layer may be further provided on the glass substrate GL.

The glass substrate GL may have a thickness TG in a range from about 20 µm to about 50 µm. When the glass substrate GL has a thickness that is less than about 20 µm, the impact resistance property of the window WM-a may be reduced, and when the glass substrate GL has a thickness that is greater than about 50 µm, the foldable property of the window WM-a may be reduced.

Figure 4:
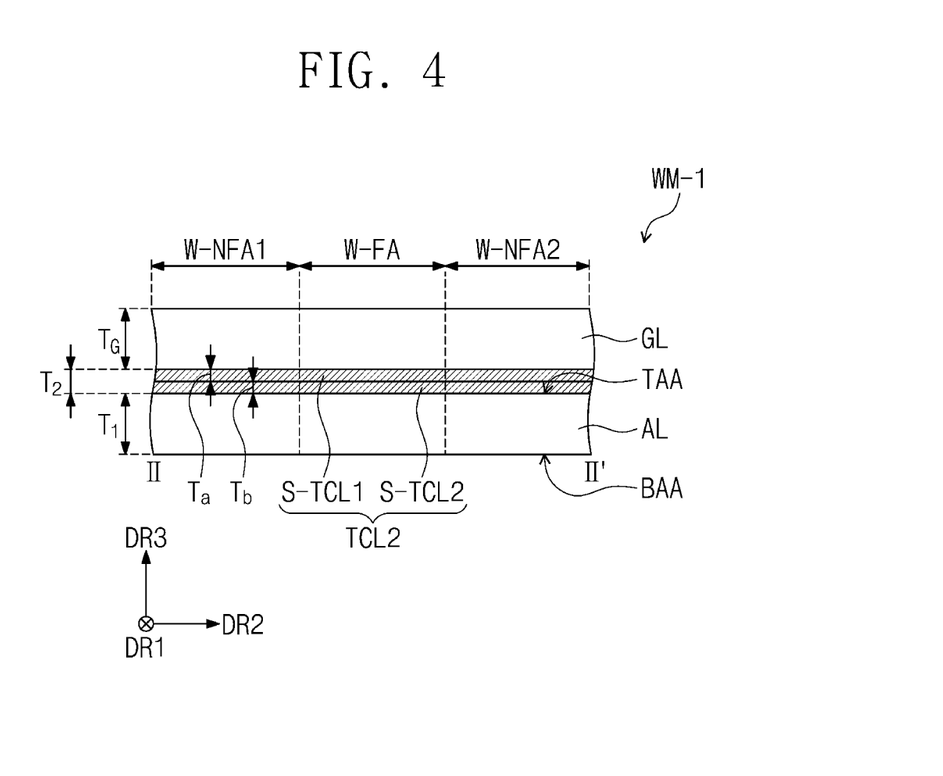
FIG. 4 is a cross-sectional view illustrating a window according to some embodiments.

FIG. 4 is a cross-sectional view illustrating a window according to some embodiments. Hereinafter, a window WM-1 according to some embodiments will be described in detail with reference to FIG. 4. The same features as those described with reference to FIGS. 1A to 3C will be omitted, and different points will be described in detail. The window WM-1 according to some embodiments is different from the embodiments described with reference to FIGS. 1A to 3C in that the upper coating layer TCL2, unlike the upper coating layer TCL shown in FIG. 3A, has a plurality of layers, in which a first sub-coating layer S-TCL1 and a second sub-coating layer S-TCL2 are sequentially laminated, instead of a single layer.

The upper coating layer TCL of the window WM-1 according to some embodiments may include the first sub-coating layer S-TCL1 and the second sub-coating layer S-TCL2, which are sequentially laminated on the impact absorbing layer AL. A sum T2 of a thickness Ta of the first sub-coating layer S-TCL1 and a thickness Tb of the second sub-coating layer S-TCL2 may be in a range from about 0.01 µm to about 1 µm. Each of the first sub-coating layer S-TCL1 and the second sub-coating layer S-TCL2 may independently include at least one of epoxy silan, silsesquioxane, imine, and silazane.

The second sub-coating layer S-TCL2 may disperse an external impact in the second direction DR2 to relieve the external impact transmitted to the first sub-coating layer S-TCL1. The first sub-coating layer S-TCL1 may disperse the external impact passing through the second sub-coating layer S-TCL2 in the second direction DR2 to relieve the external impact transmitted to the impact absorbing layer AL. Although two coating layers are laminated in FIG. 4, this is merely an example. In some embodiments of the present disclosure, the coating layer CL may include three or more plurality of coating layers that are laminated with each other.

Figure 5A:
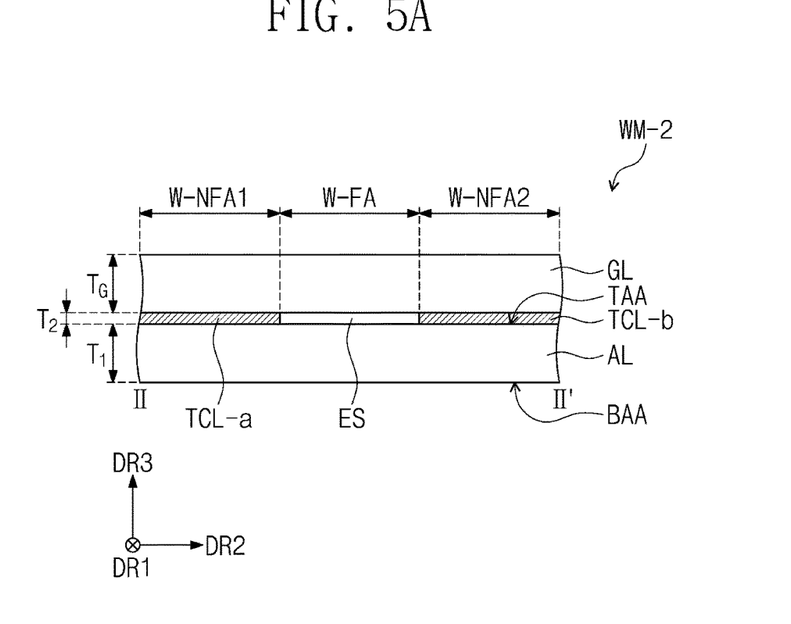
FIG. 5A is a cross-sectional view illustrating a window according to some embodiments.
Figure 5B:
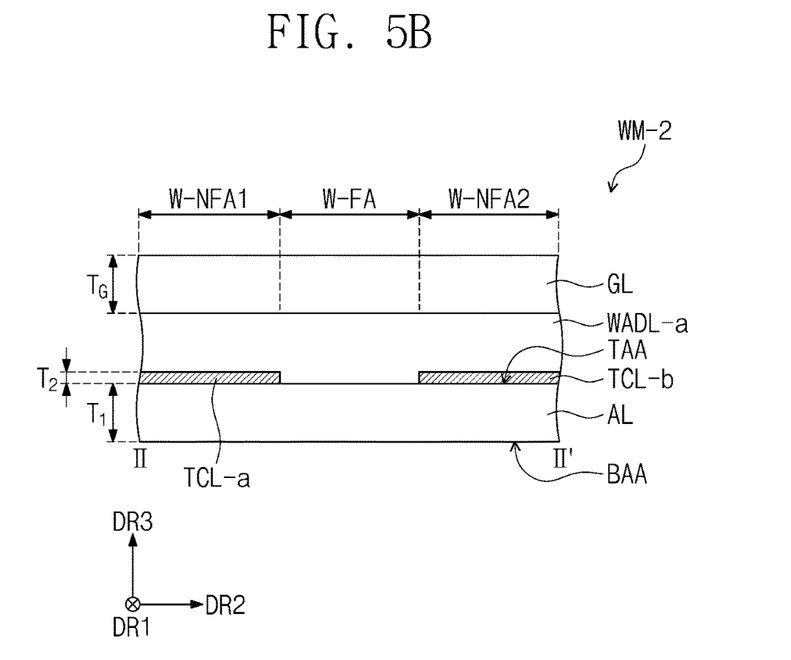
FIG. 5B is a cross-sectional view illustrating a window according to some embodiments.

FIGS. 5A and 5B are cross-sectional views each illustrating a window according to some embodiments. Hereinafter, a window WM-2 according to some embodiments will be described in detail with reference to FIGS. 5A and 5B. The same features as those previously described with reference to FIGS. 1A to 3C will be omitted, and different aspects will be described in detail. The window WM-2 according to some embodiments is different from the embodiments described with reference to FIGS. 1A to 3C in that a coating layer, unlike the coating layer TCL shown in FIG. 3A, is discontinuous, and a first coating layer TCL-a and a second coating layer TCL-b are spaced a distance from each other.

Referring to FIG. 5A, an upper coating layer of the window WM-2 according to some embodiments may include the first coating layer TCL-a overlapping the first non-folding area W-NFA1, and the second coating layer TCL-b overlapping the second non-folding area W-NFA2 and spaced apart from the first coating layer TCL-a. An empty space ES, which is between the first coating layer TCL-a and the second coating layer TCL-b, may correspond to the folding area W-FA. As the first coating layer TCL-a and the second coating layer TCL-b are spaced apart from each other to include or define the empty space ES, the bending torque of the folding area W-FA may be reduced to increase the folding property.

Referring to FIG. 5B, the window WM-2 according to some embodiments may further include an adhesive layer WADL-a contacting all of the first coating layer TCL-a, the second coating layer TCL-b, the impact absorbing layer AL, and the glass substrate GL. The adhesive layer WADL-a may fill the empty space between the first coating layer TCL-a and the second coating layer TCL-b. In the adhesive layer WADL-a, an area overlapping the folding area W-FA may have a thickness that is greater than that of areas respectively overlapping the non-folding areas W-NFA1 and W-NFA2.

Figure 6A:
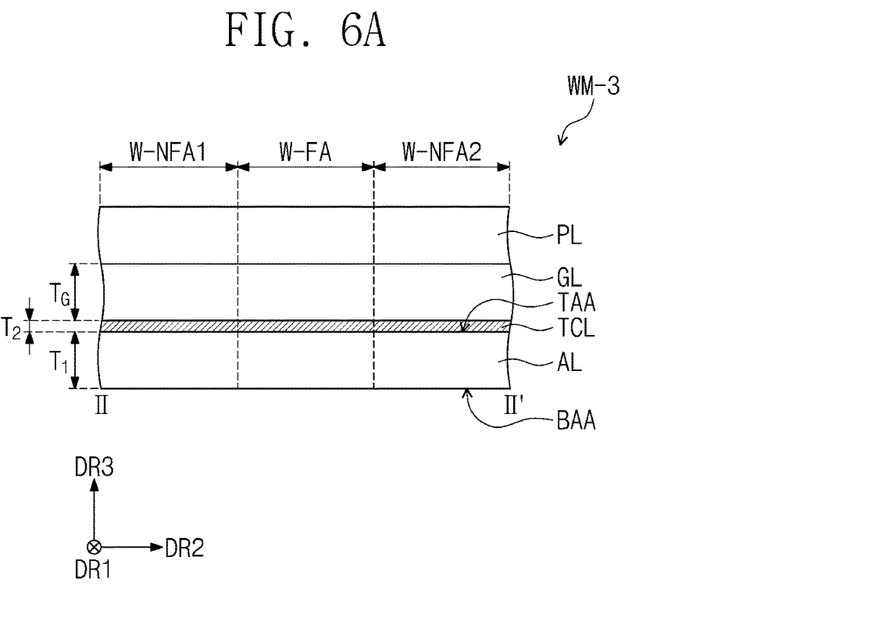
FIG. 6A is a cross-sectional view illustrating a window according to some embodiments.
Figure 6B:
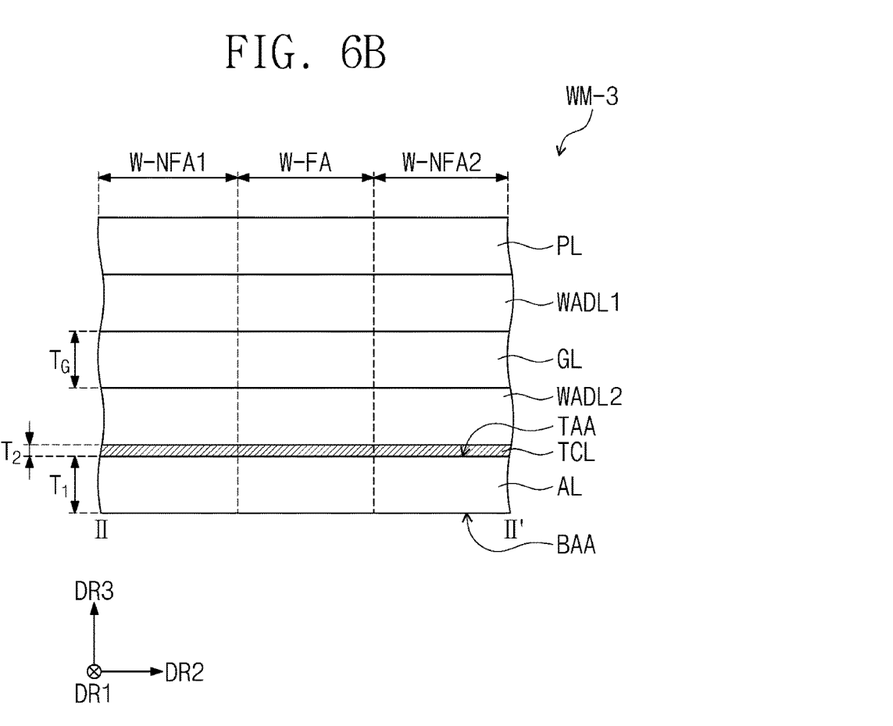
FIG. 6B is a cross-sectional view illustrating a window according to some embodiments.

FIGS. 6A and 6B are cross-sectional views each illustrating a window according to some embodiments. Hereinafter, a window WM-3 according to some embodiments will be described in detail with reference to FIGS. 6A and 6B. The same features as those previously described with reference to FIGS. 1A to 3C will be omitted, and different points will be described in detail. The window WM-3 according to some embodiments is different from the embodiments described with reference to FIGS. 1A to 3C in that a protection layer PL is further included.

The window WM-3 according to some embodiments may further include the protection layer PL located on the glass substrate GL. The protection layer PL may protect the glass substrate GL and the display panel DP, which are located therebelow. The protection layer PL may include at least one of polyimide, polyethyleneterephthlate, polycarbonate, cycloolefin polymer, and triacetyl cellulose.

The window WM-3 according to some embodiments may further include an adhesive layer WADL1 located between the glass substrate GL and the protection layer PL, and an adhesive layer WADL2 located between the glass substrate GL and the impact absorbing layer AL. Each of the adhesive layers WADL1 and WADL2 may be a pressure sensitive adhesive.

Referring to FIGS. 2B and 6B, the display device DD according to some embodiments may include at least one adhesive layer WADL1, WADL2, and PADL (refer to FIGS. 2B and 6B) located, respectively, between the glass substrate GL and the protection layer PL, between the glass substrate GL and the impact absorbing layer AL, and between the impact absorbing layer AL and the display panel DP.

Each of the adhesive layers WADL1 and WADL2 may have a thickness in a range from about 10 μm to about 100 μm. When each of the adhesive layers WADL1 and WADL2 has a thickness less than about 10 μm, an impact resistance property of the window WM-3 may be reduced, and when each of the adhesive layers WADL1 and WADL2 has a thickness equal to or greater than about 100 μm, a foldable property may be reduced.

Hereinafter, some embodiments of the present disclosure will be described in detail by comparison with a Comparative Example. The following is merely illustrative, and the present disclosure is not limited to the following.

In Table 1 below, a thickness of each of components contained in a window of an Embodiment 1, an Embodiment 2, and a Comparative Example is shown. In Table 1 below, when a thickness of a component is expressed by "0", it represents that the component is not contained.

TABLE 1

| Window | Impact absorbing layer (μm) | Glass substrate (μm) | Upper coating layer (μm) | Lower coating layer (μm) |
|---|---|---|---|---|
| Embodiment 1 | 40 | 30 | 0 | 1 |
| Embodiment 2 | 40 | 30 | 1 | 1 |
| Comparative Example | 40 | 30 | 0 | 0 |

In Table 2 below, experimental results obtained by performing a pen drop test on the windows of the Embodiment 1, the Embodiment 2, and the Comparative Example are compared and shown. The pen drop test evaluates a height, or location, at which a crack is initiated by evaluating a time at which the crack is generated in the window member when a pen is dropped at a given height. A pen used in the experiment has a weight of about 5.7 g, a ball of the pen has a diameter of about 0.7 mm, and the height at which a crack is initiated is a mean value obtained by measuring 15 times.

TABLE 2

| Window | Pen drop test (cm) |
|---|---|
| Embodiment 1 | 5.27 |
| Embodiment 2 | 5.80 |
| Comparative Example | 5.10 |

Referring to Table 2, it may be known that each of the windows of the embodiments including the lower coating layer has a pen drop height that is higher than that of the Comparative Example. Also, when the Embodiment 1 and the Embodiment 2 are compared with each other, it may be known that the impact resistance property improves in a case when the coating layer is provided on each of both sides of the impact absorbing layer more than a case when the coating layer is provided on one side of the impact absorbing layer. The embodiments may provide the window having the improved impact resistance property while maintaining the foldable property by including the glass substrate, the impact absorbing layer located below the glass substrate, and the impact absorbing layer having a small thickness located on at least one of the top and bottom surfaces of the impact absorbing layer.

The embodiments disclosed herein may provide the display device capable of protecting the display panel from the external impact by including the display panel, the window located on the display panel, the impact absorbing layer located below the glass substrate, and/or the impact absorbing layer having the relatively small thickness located on at least one of the top and bottom surfaces of the impact absorbing layer.

The window according to the described embodiments may have improved impact resistance while maintaining the foldable property/foldability by including the coating layer having the relatively small thickness located on the impact absorbing layer.

The display device according to the described embodiments may reduce or prevent the likelihood of damage to the display panel due to external impact by including the window having the improved impact resistance property while maintaining the foldable property.

Although some embodiments of the present disclosure have been described, it is understood that the present disclosure should not be limited to these embodiments but various changes and modifications can be made by one ordinary skilled in the art within the spirit and scope of the present disclosure as hereinafter claimed. Hence, the real protective scope of the present disclosure shall be determined by the technical scope of the accompanying claims.

What is claimed is:

1. A window comprising:
a glass substrate;
an impact-absorbing layer overlapping the glass substrate and having a first storage modulus as measured at room temperature using a nano indenter; and
at least one coating layer disposed on at least one of top and bottom surfaces of the impact-absorbing layer, where the at least one coating layer comprises a first sub-coating layer having a second storage modulus, and a second sub-coating layer having a third storage modulus, wherein each of the second storage modulus and the third storage modulus is greater than the first storage modulus, as measured at room temperature using the nano indenter,
wherein the first sub-coating layer and the second sub-coating layer comprise different materials,
wherein a ratio between a first thickness of the impact-absorbing layer and a second thickness that is a sum of thicknesses of the first and second sub-coating layers is about 1:0.0002 to about 1:0.05,
wherein the impact-absorbing layer comprises at least one of polyimide, polyethyleneterephthalate, polycarbonate, cycloolefin polymer, or triacetyl cellulose,
wherein the window comprises:
a folding area capable of being folded along a folding axis extending in one direction; and
a first non-folding area and a second non-folding area that are spaced apart from each other with the folding area therebetween, and
wherein the impact-absorbing layer, the first sub-coating layer, and the second sub-coating layer at least partially overlap each other in the first non-folding area and the second non-folding area, and the first sub-coating layer and the second sub-coating layer completely overlap each other in the folding area, wherein overlap is evaluated in plan view when the window is not folded.

2. The window of claim 1, wherein the first thickness is in a range from about 20 μm to about 50 μm, and
wherein the second thickness is in a range from about 0.01 μm to about 1 μm.

3. The window of claim 1, wherein the glass substrate has a thickness in a range from about 20 μm to about 70 μm.

4. The window of claim 1, wherein a ratio of the first storage modulus to the second storage modulus and/or the third storage modulus is from about 1:4 to about 1:15.

5. The window of claim 1, wherein the at least one coating layer comprises at least one of epoxy silane, silsesquioxane, imine, or silazane.

6. The window of claim 1, wherein the at least one coating layer is deposited by using a thermal deposition apparatus, an E-beam deposition apparatus, or a sputtering apparatus.

7. The window of claim 1, wherein the first sub-coating layer and the second sub-coating layer independently include at least one of epoxy silane, silsesquioxane, imine, or silazane.

8. The window of claim 7, wherein the second thickness is in a range from about 0.01 μm to about 1 μm.

9. The window of claim 1, further comprising a protection layer comprising at least one of polyimide, polyethyleneterephthalate, polycarbonate, cycloolefin polymer, or triacetyl cellulose.

10. The window of claim 9, further comprising at least one adhesive layer between the protection layer and the glass substrate and/or between the glass substrate and the impact-absorbing layer.

11. A display device comprising:
a display panel; and
the window of claim 1 on the display panel.

12. The display device of claim 11, wherein the window further comprises:
a protection layer on the glass substrate; and
at least one adhesive layer located between the protection layer and the glass substrate, between the glass substrate and the impact absorbing layer, and/or between the impact absorbing layer and the display panel.

13. The display device of claim 12, wherein at least one of the at least one adhesive layer has a thickness in a range from about 10 μm to about 100 μm.

14. The display device of claim 12, wherein the at least one adhesive layer comprises a pressure sensitive adhesive.

* * * * *